US012584708B2

(12) United States Patent
Lewin

(10) Patent No.: US 12,584,708 B2
(45) Date of Patent: Mar. 24, 2026

(54) GUN TARGETING SYSTEM

(71) Applicant: BAE SYSTEMS PLC, London (GB)

(72) Inventor: Richard Peter Lewin,
Barrow-in-Furness (GB)

(73) Assignee: BAE SYSTEMS PLC, London (GB)

( * ) Notice: Subject to any disclaimer, the term of this
patent is extended or adjusted under 35
U.S.C. 154(b) by 0 days.

(21) Appl. No.: 18/849,221

(22) PCT Filed: Mar. 10, 2023

(86) PCT No.: PCT/GB2023/050564
§ 371 (c)(1),
(2) Date: Sep. 20, 2024

(87) PCT Pub. No.: WO2023/180686
PCT Pub. Date: Sep. 28, 2023

(65) Prior Publication Data
US 2025/0198721 A1    Jun. 19, 2025

(30) Foreign Application Priority Data

Mar. 23, 2022  (EP) ..................................... 22275034
Mar. 23, 2022  (GB) ..................................... 2204039

(51) Int. Cl.
*F41A 27/24*       (2006.01)
*B60G 17/015*     (2006.01)
*F41A 27/22*       (2006.01)
(52) U.S. Cl.
CPC ............ *F41A 27/24* (2013.01); *B60G 17/015*
(2013.01); *F41A 27/22* (2013.01);
(Continued)
(58) Field of Classification Search
CPC .......... F41A 23/28; F41A 23/34; F41A 27/06;
F41A 27/22; F41A 27/24; B60G 17/015;
B60G 17/017
See application file for complete search history.

(56) References Cited

U.S. PATENT DOCUMENTS

| | | | |
|---|---|---|---|
| 2,376,849 A | 5/1945 | Rossmanith | |
| 3,912,289 A | 10/1975 | Czajkowski, Jr. | |
| | (Continued) | | |

FOREIGN PATENT DOCUMENTS

| | | | |
|---|---|---|---|
| FR | 3092791 A1 | 8/2020 | |
| GB | 197659 A | 9/1923 | |
| | (Continued) | | |

OTHER PUBLICATIONS

International Search Report and Written Opinion received for
PCT/GB2023/050564. Mail Date: May 30, 2023. 10 pages.
(Continued)

*Primary Examiner* — Bret Hayes
(74) *Attorney, Agent, or Firm* — Arcane Law PLLC

(57)                    ABSTRACT

A gun targeting system (10) comprising a chassis (200). A
gun barrel (300) is mounted to the chassis (200) by a pivot
mount (304). The system also comprises a chassis suspen-
sion system (400) comprising a plurality of wheel arms
(402), each wheel arm (402) extending away from a different
chassis mount (220) on the chassis (200) to a respective
wheel (404), each wheel (404) being rotatably mounted on
its respective wheel arm (402), each wheel (404) configured
for engagement with a support surface (500). The gun
targeting system (10) is operable to position the barrel (300)
towards an orientation to target an object by pivoting one or
more wheel arms (402) relative to the chassis (200) and/or
by pivoting one or more wheels (404) relative to its respec-
tive wheel arm (402) and/or by rotating one or more wheels
(404) relative to its respective wheel arm (402).

20 Claims, 4 Drawing Sheets

(52) U.S. Cl.
     CPC .... *B60G 2500/30* (2013.01); *B60G 2800/012*
                  (2013.01); *B60G 2800/014* (2013.01)

(56)                    References Cited

U.S. PATENT DOCUMENTS

| | | | |
|---|---|---|---|
| 4,241,803 A | 12/1980 | Lauber | |
| 4,265,326 A | 5/1981 | Lauber | |
| 6,311,795 B1 | 11/2001 | Skotnikov et al. | |
| 2019/0210670 A1* | 7/2019 | Bodin .................... | B60G 11/20 |
| 2023/0107884 A1* | 4/2023 | Sundquist ................ | F41G 5/24 |
| | | | 180/9.52 |
| 2026/0001380 A1 | 1/2026 | Bees et al. | |

FOREIGN PATENT DOCUMENTS

| | | | |
|---|---|---|---|
| GB | 1438403 A | 6/1976 | |
| WO | 200032462 A1 | 6/2000 | |
| WO | 2007097779 A2 | 8/2007 | |
| WO | 2023180687 A1 | 9/2023 | |
| WO | WO2023180686 A1 | 9/2023 | |

OTHER PUBLICATIONS

Extended European Search Report received for EP Application No.
22275034.1. Mail Date: Aug. 31, 2022. 9 pages.
GB Search Report received for GB Application No. 2204039.8.
Mail Date: Sep. 13, 2022. 3 pages.

* cited by examiner

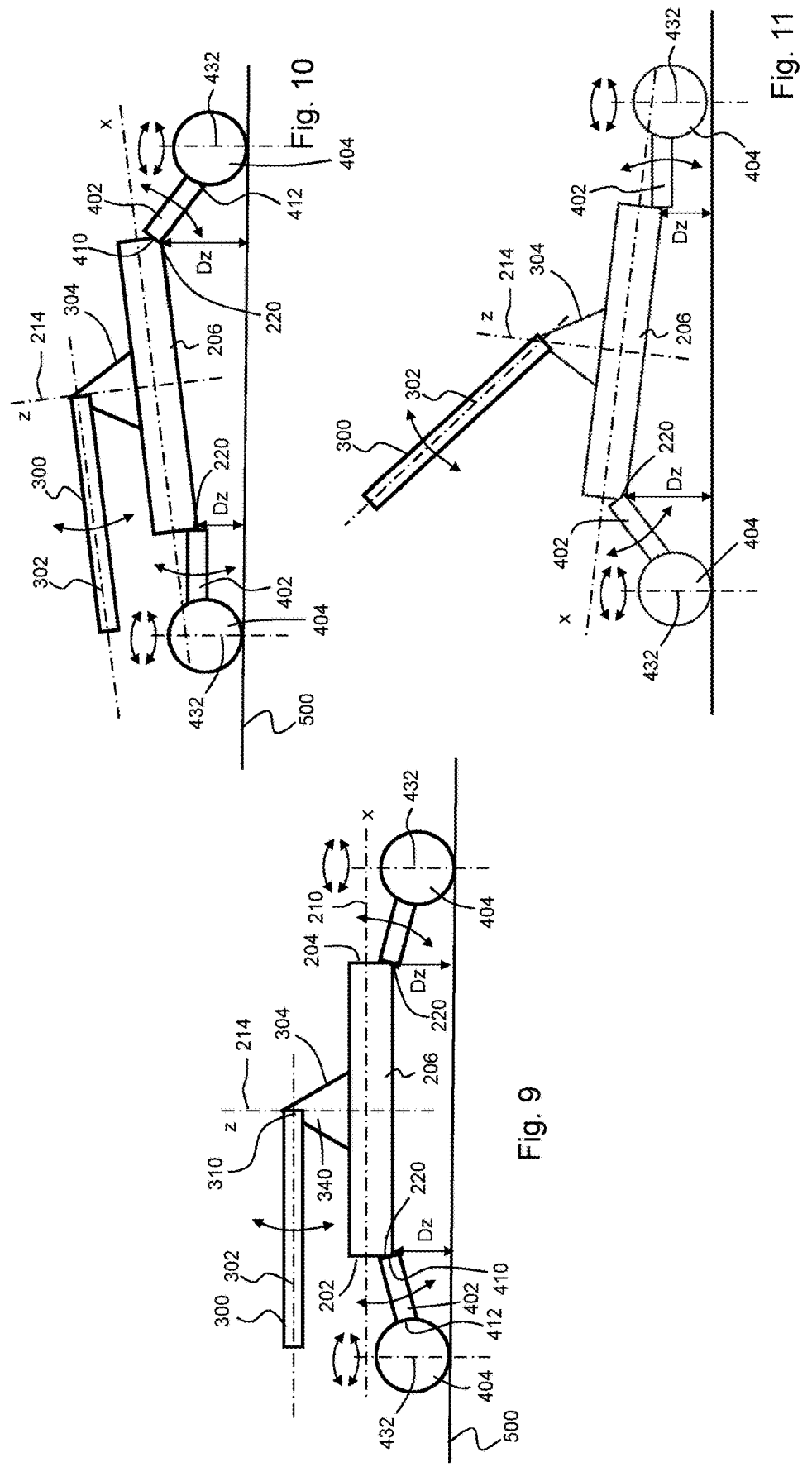

GUN TARGETING SYSTEM

FIELD

The present disclosure relates to a gun targeting system.

BACKGROUND

For a gun system to be effective it must be pointed in the correct direction prior to a shot being fired. With small arms this is achieved, at least in part, by manually positioning the barrel of the gun. In larger calibre vehicular systems, and systems mounted on a turret or platform, positioning of the gun barrel is achieved mechanically.

Generally to achieve aim in any direction the two primary directions of movement are broken out into separate systems, namely those dealing with elevation (i.e. how high or low relative to the ground the gun is pointed) and traverse (i.e. how far left or right the gun is swung to be pointed, for example as shown in FIGS. 1 to 3).

Typically vehicular gun systems elevation is controlled by an elevation system comprising for example lead screws, hydraulic/pneumatic rams and/or gearing. Traverse may be achieved by a traverse bearing, slew ring, or turret. As illustrated in FIGS. 1 to 3, this is a device which allows the gun to rotate relative to the body/chassis of the vehicle.

However, the problem with such systems is that the systems for controlling traverse, while conventionally essential, add significant weight to the vehicle. The extra weight means that the vehicle which forms part of the gun targeting system is inherently less agile, may be slower, and requires more fuel for the same distance travelled than a lighter weight system. Not only is the mechanism for controlling traverse required, but this must be a robust structure since it should be capable of functioning long-term, which means it must be able to survive recoil forces from firing of the gun. Another issue is that any systems which interact with the gun system (i.e. loading systems) must be able to account for this movement. Additionally the chassis to which the traverse system is mounted must also be suitably robust, and hence of large mass, to support the traverse system.

Hence a gun targeting system which provides a relatively lightweight solution (compared to examples of the prior art) to the problem of delivering a weapon system to a firing position and then targeting the gun of the weapon system, is highly desirable.

SUMMARY

According to the present disclosure there is provided an apparatus and method as set forth in the appended claims. Other features of the invention will be apparent from the dependent claims, and the description which follows.

Accordingly there may be provided a gun targeting system (10) comprising a chassis (200) extending along an x-axis, a first end (202) of the chassis (200) and a second end (204) of the chassis (200) spaced apart from one another along the x-axis. The chassis (200) may extend along a y-axis, a first side (206) of the chassis (200) and a second side (208) of the chassis (200) spaced apart from one another along the y-axis. The x-axis may be at right angles to the y-axis. The x-axis may define a chassis roll axis (210). The y-axis may define a chassis pitch axis (212). A z-axis may define a chassis yaw axis (214). The z-axis may be perpendicular to the x-axis and y-axis. There may be provided a gun barrel (300) having a barrel axis (302), the barrel (300) being mounted to the chassis (200) by a pivot mount (304).

The barrel (300) may be pivotable relative to the x-axis about a pivot axis (310) aligned with (e.g. parallel to) the y-axis. The barrel (300) may be mounted such that it is constrained to move in a plane defined by the x-axis and z-axis of the chassis 200.

There may be provided a chassis suspension system (400) comprising a plurality of wheel arms (402), each wheel arm (402) extending away from a different chassis mount (220) on the chassis (200) to a respective wheel (404), each wheel (404) being rotatably mounted on its respective wheel arm (402), each wheel (404) configured for engagement with a support surface (500), each wheel arm (402) and wheel (404) configured to support the chassis (200) apart from the support surface (500), for example in the direction of the z-axis. Each wheel arm (402) may be pivotable relative to the chassis (200) such that the roll of the chassis (200) about the x-axis, the pitch of the chassis (200) about the y-axis and the yaw of the chassis (200) about the z-axis is controllable by pivoting at least one of the wheel arms (402) relative to the chassis (200). Each wheel (404) may be pivotable relative to its respective wheel arm (402) such that the gun targeting system (10) is operable to position the barrel (300) towards an orientation to target an object by pivoting one or more wheel arms (402) relative to the chassis (200) and/or by pivoting one or more wheels (404) relative to its respective wheel arm (402) and/or by rotating one or more wheels (404) relative to its respective wheel arm (402).

Each wheel arm (402) may have a chassis mount end (410) and a wheel mount end (412); the chassis mount end (410) of each wheel arm (402) being provided with a chassis mounting member (414), the chassis mount end (410) of each wheel arm (402) and chassis mounting member (414) being pivotable relative to one another around a chassis mount pivoting axis (230); and the chassis mounting member (414) is configured to support the chassis mount end (410) of the wheel arm (402) so that the wheel arm (402) and chassis mounting member (414) are operable to pivot at least 180 degrees relative to one another about the chassis mount pivoting axis (230).

Each wheel arm (402) may be provided with a wheel arm actuator (430) to control the orientation of each wheel arm (402) relative to the chassis (200).

The wheel mount end (412) of each wheel arm (402) may be provided with a wheel mounting member (416), the wheel mount end (412) of each wheel arm (402) and wheel mounting member (416) being pivotable relative to one another around a wheel mount pivoting axis (432); and each wheel mounting member (416) is configured to couple with the wheel mount end (412) of the wheel arm (402) so that each wheel arm (402) and wheel mounting member (416) are operable to pivot at least 180 degrees relative to one another about the wheel mount pivoting axis (432).

Each wheel mounting member (416) may be provided with a wheel mounting member actuator (440) to control the orientation of each wheel (404) relative to its respective wheel arm (402).

The gun targeting system (10) may comprise a control system (600) operable to control the wheel arm actuators (430) to: roll the chassis (200) about the x-axis, pitch the chassis (200) about the y-axis and/or yaw the chassis (200) about the z-axis to orientate the chassis (200), and each wheel arm actuator (430) is operable independently of the other wheel arm actuators (430).

The control system (600) may be operable to control the wheel mounting member actuators (440) to pivot each wheel (404) about the wheel mount pivoting axis (432), and each wheel mounting member actuator (440) is operable independently of the other wheel mounting member actuators (440).

The gun barrel (300) may be coupled to a gun barrel actuator (340) operable to pivot the gun barrel (300) about the pivot axis (310), the control system (600) being operable to control the gun barrel actuator (340) to pivot the gun barrel (300) about the pivot axis (310).

Each actuator maybe operable independently of every other actuator.

The control system (600) may be operable to control the wheel arm actuators (430), wheel mounting member actuators (440), and the gun barrel actuator (340) to position the barrel (300) to target an object.

At least one wheel (404) may be coupled to a drive system (700) to rotate the or each wheel (404) relative to its respective wheel arm (402) to thereby move the gun targeting system (10) from one location to another.

The control system (600) may be operable to control the drive system (700) to thereby drive the or each wheel (404) to move the gun targeting system (10) from one location to another.

The wheel drive system (700) may comprise an actuator (702) coupled to the or each wheel (404), wherein each wheel drive actuator (702) is operable independently of each other wheel drive actuator (702).

There may also be provided a method of control of a gun targeting system, the gun targeting system comprising: a gun barrel (300), a chassis (200), wheel arm actuators (430), wheel mounting member actuators (440), wheel drive system (700) and gun barrel actuator (340) to target an object; the gun barrel (300) mounted to the chassis (300); wherein the chassis (200) extends along an x-axis, a first end (202) of the chassis (200) and a second end (204) of the chassis (200) spaced apart from one another along the x-axis; the chassis (200) extending along a y-axis, a first side (206) of the chassis (200) and a second side (208) of the chassis (200) spaced apart from one another along the y-axis; the x-axis being at right angles to the y-axis; the x-axis defining a chassis roll axis (210), the y-axis defining a chassis pitch axis (212) and a z-axis defining a chassis yaw axis (214); the z-axis being perpendicular to the x-axis and y-axis; the gun barrel (300) having a barrel axis (302) and being pivotable relative to the x-axis about a pivot axis (310) parallel with the y-axis and mounted such that it is constrained to move in a plane defined by the x-axis and z-axis; the wheel arm actuators (430), wheel mounting member actuators (440), wheel drive system (700) forming part of a chassis suspension system (400) coupled to the chassis (200), and the gun barrel actuator (340) coupled to the gun barrel (300); wherein the method comprises the steps of: controlling the wheel drive system (700) to transport the gun targeting system (700) to a gun firing location; controlling the wheel mounting member actuators (440) and/or drive system (700) to position the barrel (300) towards an orientation to target an object and, if further adjustment is required, controlling the wheel arm actuators (430), wheel mounting member actuators (440), and/or the gun barrel actuator (340) to position the barrel (300) towards an orientation to target an object.

Hence there is provided a configuration of a gun targeting system which enables a relatively lightweight solution of delivering a weapon system to a firing position and then targeting the gun of the weapon system, compared to examples of the related art.

BRIEF DESCRIPTION OF THE FIGURES

Embodiments of the invention will now be described by way of example only with reference to the figures, in which:

FIGS. 9 to 11 further illustrate how the gun targeting system of the present disclosure may be operated, with the gun targeting system shown from a side view.

DETAILED DESCRIPTION

Figures 1, 2, 3:
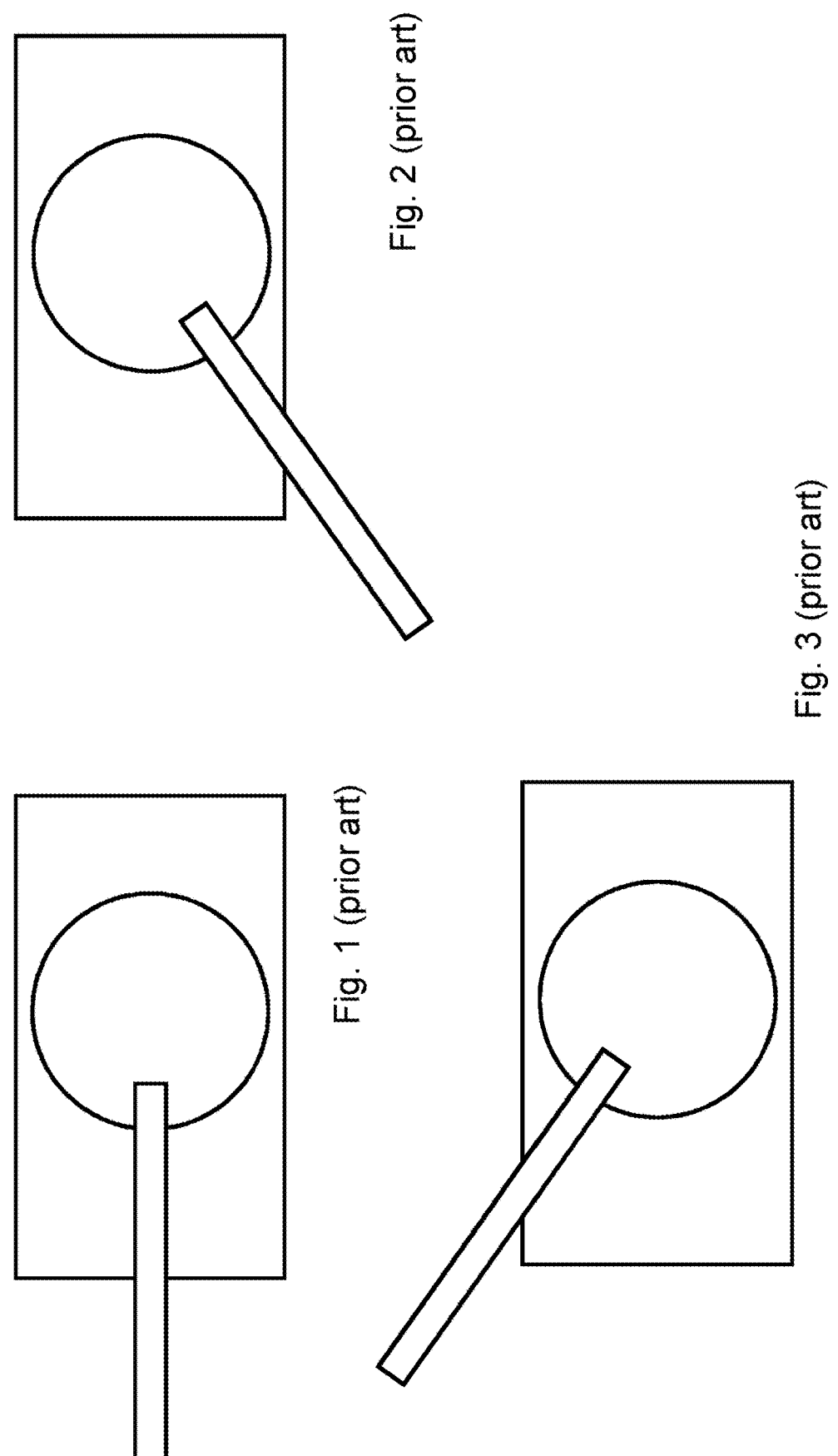
FIGS. 1 to 3 show a plan view of a vehicular weapon delivery system of the prior art.

The present disclosure relates to gun targeting system 10. In particular the present disclosure relates to a gun targeting system provided as a vehicle for transporting, supporting and targeting a gun as well as a method of controlling a gun targeting system. The vehicle may be a self-propelled vehicle.

FIGS. 4 to 8 show a plan view of the gun targeting system 10 of the present disclosure, illustrating key features and operation of the gun targeting system 10. FIGS. 9 to 11 show the gun targeting system 10 of the present disclosure shown from a side view.

As shown in these figures, the gun targeting system 10 comprises a chassis 200 extending along an x-axis, a first end 202 of the chassis 200 and a second end 204 of the chassis 200 spaced apart from one another along the x-axis. The chassis 200 also extends along a y-axis, a first side 206 of the chassis 200 and a second side 208 of the chassis 200 spaced apart from one another along the y-axis. The x-axis is at right angles to the y-axis.

The x-axis defines a chassis roll axis 210. The y-axis defines a chassis pitch axis 212. A z-axis defines a chassis yaw axis 214, the z-axis being perpendicular to the x-axis and y-axis.

The gun targeting system 10 further comprises a gun barrel 300 having a barrel axis 302. As shown in FIGS. 9 to 11, the barrel 300 is mounted to the chassis 200 by a pivot mount 304, the barrel 300 being pivotable relative to the x-axis about a pivot axis 310 aligned with (e.g. parallel to) the y-axis. That is to say, the barrel 300 is pivotable relative to the x-axis about a pivot axis 310 aligned with (e.g. parallel to) the y-axis and mounted such that it is constrained to move in a plane defined by the x-axis and z-axis. Put another way, the barrel 300 is pivotable relative to the x-axis about a pivot axis 310 aligned with (e.g. parallel to) the y-axis, and the barrel 300 is mounted to the chassis 200, directly or indirectly, such that it is constrained to move in a plane defined by the x-axis and z-axis. That is to say, while the barrel 300 may be pivotable relative to the x-axis about a pivot axis 310 aligned with (e.g. parallel to) the y-axis, it is non-rotatable about the z-axis. Put another way, the barrel 300 is limited to pivot relative to the x-axis about a pivot axis 310 aligned with (e.g. parallel to) the y-axis, and mounted to the chassis 200 (e.g. directly or indirectly) so that it cannot be swung around the z-axis.

The gun targeting system 10 further comprises a chassis suspension system 400. The chassis suspension system 400 comprises a plurality of wheel arms 402, each wheel arm 402 extending away from a different chassis mount 220 on the chassis 200 to a respective wheel 404, each wheel 404 being rotatably mounted on its respective wheel arm 402, each wheel 404 configured for engagement with a support surface 500.

Each wheel arm 402 is pivotable relative to the chassis 200 such that the roll of the chassis 200 about the x-axis, the pitch of the chassis 200 about the y-axis and the yaw of the chassis 200 about the z-axis is controllable by pivoting at least one of the wheel arms 402 relative to the chassis 200. Additionally, each wheel 404 is pivotable relative to its respective wheel arm 402.

Figures 4, 5:
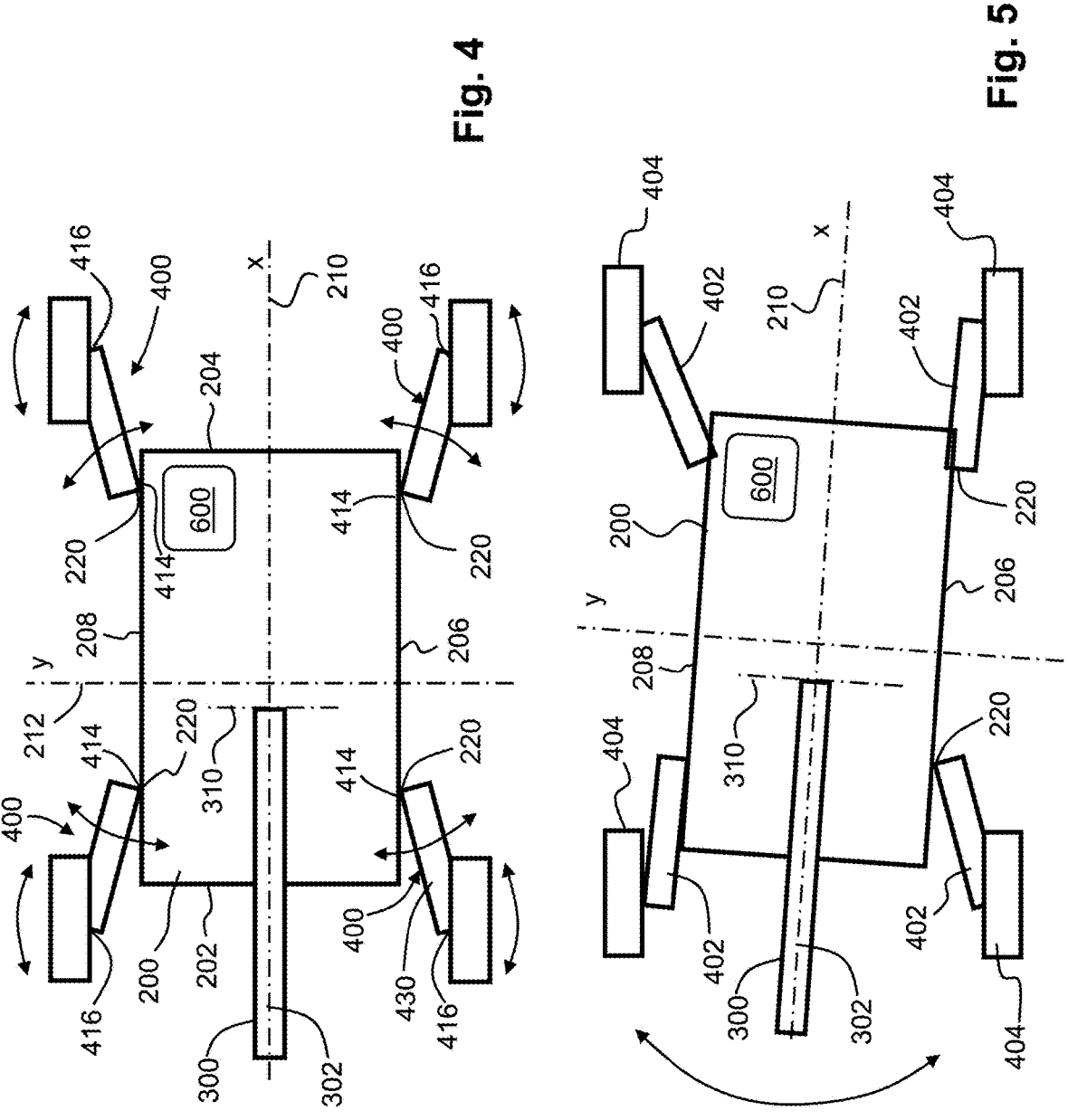
FIGS. 4, 5 illustrate the key features of the gun targeting system of the present disclosure, with the gun targeting system shown from a plan view.

Hence each wheel arm 402 may be pivotable relative to the chassis 200 about an axis parallel to the z-axis (as shown in FIG. 4) and/or may be pivotable relative to the chassis 200 about an axis parallel to the y-axis (for example shown in FIGS. 9, 10, 11). That is to say, each wheel arm 402 may be pivotable relative to the chassis 200 in a direction having a component parallel to the z-axis and/or parallel to the y-axis. Hence pivoting a wheel arm 402 about the z-axis, will yaw the chassis 200 about the z-axis, and pivoting wheel arm 402 about the y-axis, will pitch the chassis about the y-axis.

Additionally, each wheel 404 is pivotable relative to its respective wheel arm 402 to thereby change the angle of one or more of the wheels 404 relative to its respective wheel arm 402 (for example shown in FIGS. 9, 10, 11). Hence, for example, such pivoting of a wheel 404 relative to its respective wheel arm 402 alters the direction which the wheel 404 is aligned such that when the wheel is rotated the chassis/vehicle is steered in a direction dictated by the orientation of the wheel 404 relative to its respective wheel arm 402.

As shown in FIGS. 9 to 11, each wheel arm 402 and wheel 404 are configured to support the chassis 200 apart from the support surface 500. Each wheel arm 402 and wheel 404 may be configured to support the chassis 200 apart from the support surface 500 in the direction of the z-axis. Each wheel arm 402 and wheel 404 may be configured to support the chassis 200 a distance Dz apart from the support surface 500 in the z-axis, where the distance Dz can be varied by the suspension system 400, and may vary for different locations on the chassis 200.

Each wheel arm 402 has a chassis mount end 410 which in use is adjacent to the chassis 200 and a wheel mount end 412 to which may be attached one of the wheels 404 for supporting the chassis 200.

The chassis mount end 410 of each wheel arm 402 may be provided with a chassis mounting member 414 (for example a bracket for attaching to the chassis 200, the chassis mount end 410 of each wheel arm 402 and chassis mounting member 414 being pivotable relative to one another around a chassis mount pivoting axis 230. The chassis mounting member 414 may be configured to support (e.g. couple) the chassis mount end 410 of the wheel arm 402 so that the wheel arm 402 and chassis mounting member 414 are operable to pivot at least 180 degrees relative to one another about the chassis mount pivoting axis 230. That is to say, the wheel arm 402 may be mounted to the chassis mount 220 (for example via the chassis mounting member 414) such that the wheel arm 402 is operable to pivot at least 180 degrees relative to the chassis mount 220. The wheel arm 402 and chassis mounting member 414 may be operable to pivot at least 180 degrees but no more than 200 degrees relative to one another. The wheel arm 402 and chassis mounting member 414 may be operable to pivot at least 180 degrees but no more than 190 degrees relative to one another. For example, the chassis mounting member 414 and/or chassis mount 220 may space the chassis end of the wheel arm 402 apart from the chassis 200 so that the wheel arm 402 may be parallel to the chassis 200 (e.g. extending parallel to the x-axis and/or extending in a direction having a component in a direction parallel to the x-axis), or allow the wheel arm 402 to extend from its chassis mount end towards the chassis 200 (e.g. angled 95 degrees relative to the y-axis and/or extending in a direction having a component in a direction angled 95 degrees to the y-axis). The wheel arm 402 and chassis mount 220 may be pivotable relative to one another around an axis parallel to the z axis and/or around a vertical axis. Each chassis mounting member 414 may comprise a universal joint.

Each wheel arm 402 may be provided with a wheel arm actuator 430 to control the orientation of each wheel arm 402 relative to the chassis 200.

The wheel mount end 412 of each wheel arm 402 may be provided with a wheel mounting member 416 (e.g. a bracket) for attaching to one of the wheels 404, the wheel mount end 412 of each wheel arm 402 and wheel mounting member 416 being pivotable relative to one another around a wheel mount pivoting axis 432.

Each wheel mounting member 416 is configured to couple with the wheel mount end 412 of the wheel arm 402 so that each wheel arm 402 and wheel mounting member 416 (and hence wheel 404) are operable to pivot 180 degrees relative to one another about the wheel mount pivoting axis 432. Each wheel arm 402 and respective wheel mounting member 416 (and hence wheel 404) may be operable to pivot at least 180 degrees but no more than 200 degrees relative to one another about the wheel mount pivoting axis 432. Each wheel arm 402 and respective wheel mounting member 416 (and hence wheel 404) may be operable to pivot at least 180 degrees but no more than 190 degrees relative to one another about the wheel mount pivoting axis 432. Each wheel mounting member 416 may comprise a universal joint 420.

The chassis mount pivoting axis 230 may be parallel to the wheel mount pivoting axis 432. The chassis mount pivoting axis 230 may be aligned with (e.g. parallel to) the z-axis.

Each wheel mounting member 416 is provided with a wheel mounting member actuator 440 to control the orientation of each wheel 402 relative to its respective wheel arm 402.

At least one wheel 404 is coupled to a drive system 700 to rotate the, or each, wheel 404 relative to its respective wheel arm 402 to thereby move the gun targeting system 10 from one location to another.

The wheel drive system 700 comprises an actuator 702 coupled to the or each wheel 404, wherein each wheel drive actuator 702 is operable independently of each other wheel drive actuator 702.

The suspension system is configured such that the gun targeting system 10 is operable to position the barrel 300 towards an orientation to target an object by pivoting one or more of the wheel arms 402 relative to the chassis 200 and/or by pivoting one or more wheels 404 relative to its respective wheel arm 402 and/or by rotating one or more wheels 404 relative to its respective wheel arm 402.

The gun targeting system 10 may further comprise a control system 600 operable to control the wheel arm actuators 430 to roll the chassis 200 about the x-axis, pitch the chassis 200 about the y-axis and/or yaw the chassis 200 about the z-axis to orientate (e.g. angle) the chassis 200. That is to say, the control system 600 is operable to control the suspension 400 position the barrel 300 relative to a target.

Additionally or alternatively the control system 600 may be operable to control the wheel mounting member actuators 440 to pivot each wheel 404 about the wheel mount pivoting axis 432, and each wheel mounting member actuator 440 is operable (e.g. controllable) independently of the other wheel mounting member actuators 440.

The gun barrel 300 may be coupled to a gun barrel actuator 340 operable to pivot the gun barrel 300 about the pivot axis 310, the control system 600 being operable to control the gun barrel actuator 340 to pivot the gun barrel 300 about the pivot axis 310.

Each actuator (i.e. each of the wheel arm actuators 430, wheel mounting member actuators 440 and gun barrel actuator 340) may be operable (e.g. controllable) independently of each other actuator.

The control system 600 may be operable to control the wheel arm actuators 430, wheel mounting member actuators 440, and the gun barrel actuator 340 to position the barrel 300 to target an object. For example, the control system 600 may be operable to control the wheel arm actuators 430, wheel mounting member actuators 440, and the gun barrel actuator 340 to position the barrel 300 to target an object in response to a command from a user to target an object and/or in response to receipt of data which identifies and/or locates a target, and/or in response to sensing and/or identifying a target. Additionally or alternatively, the control system 600 may be operable to control the drive system 700 to thereby drive the or each wheel 404 to move the gun targeting system 10 from one location to another (for example to get closer to a target and/or to achieve a desired position relative to a target).

Figures 6, 7, 8:
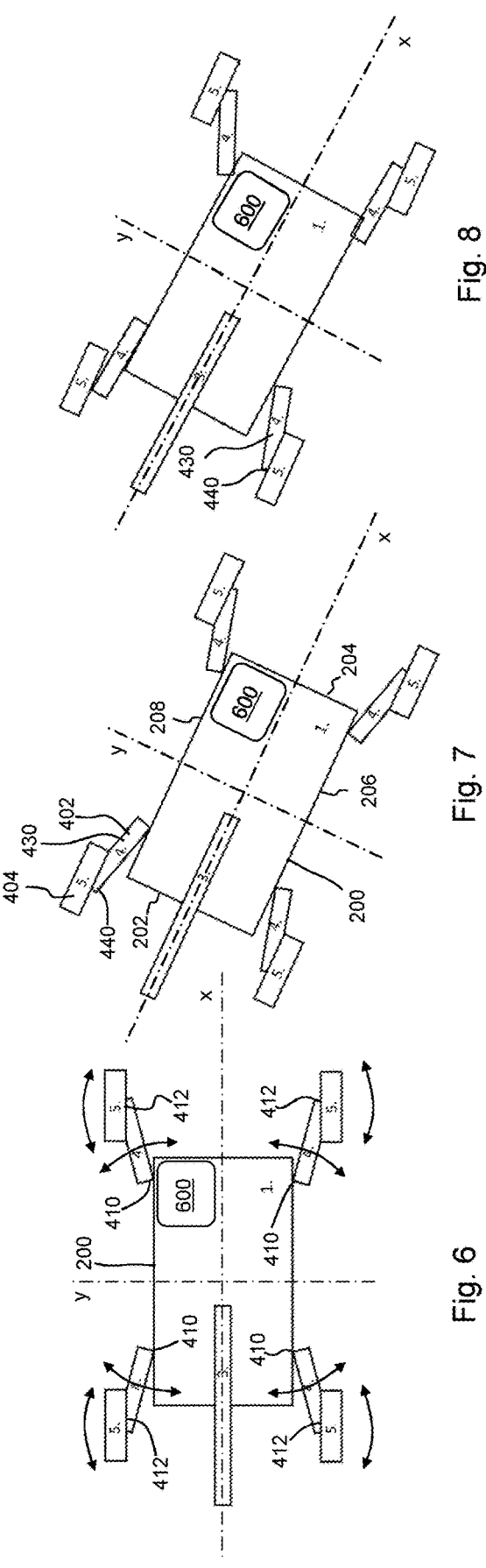
FIGS. 6 to 8 illustrate an example of how the gun targeting system of the present disclosure may be operated, with the gun targeting system shown from a plan view.

The gun targeting system 10 may be operated according to a method comprising the steps of controlling the wheel drive system 700 to transport the gun targeting system 700 to a gun firing location, for example to arrive at a location as shown in FIG. 6 and FIG. 9. If the gun barrel 300 is not positioned towards the target (e.g. its elevation and traverse are not as required to deliver a projectile from the barrel 300 to the target), then the wheel mounting member actuators 440 and/or drive system 700 are controlled to position the barrel 300 towards an orientation to target the object (for example in FIG. 7, where the chassis 200 is rotated, by way of example, around the z-axis relative to the orientation shown in FIG. 6. Alternatively and/or additionally, the wheel arm actuators 430, wheel mounting member actuators 440, and/or the gun barrel actuator 340 may be controlled to position the barrel 300 towards an orientation to target an object, for example as shown in FIG. 8. Alternatively and/or additionally, the wheel arm actuators 430, wheel mounting member actuators 440, and/or the gun barrel actuator 340 may be controlled to position the barrel 300 towards an orientation to target an object as shown in FIG. 10 or FIG. 11, where the chassis 200 is rotated, by way of example, around the y-axis relative to the orientation shown in FIG. 9, and the barrel 300 may be rotated about the pivot axis 310.

The method may further comprise the step of operating the gun to fire a projectile only when the gun barrel 300 is in a plane defined by the x-axis and z-axis. In the example shown the gun barrel 300 is always in a plane defined by the x-axis and z-axis (e.g. it is constrained to pivot about a pivot axis 310 parallel to the y-axis) and mounted to the chassis 200 (e.g. directly or indirectly) so that it cannot be swung around the z-axis. In other examples, the gun barrel may have stowed/travel orientation, and is aligned in a plane defined by the x-axis and z-axis prior to firing.

That is to say, in a gun targeting system according to the present disclosure, coarse steering is achieved by repositioning the vehicle on the wheels 404 for example to achieve a change in position between that shown in FIG. 6 and FIG. 7. This could be achieved by driving forwards and/or backwards. In other examples, not shown, this may utilize a mechanism which would allow the vehicle to rotate on the spot (e.g. about the z-axis). Such positioning achieves a reasonable level of accuracy but, on rough terrain in particular, will not reliably achieve the <1 mil requirement for many weapon systems.

Fine traverse is achieved by manipulating the wheel arms and suspension once the vehicle is parked. Accordingly, the wheel arms are constructed so that the wheels can be moved towards/away from the vehicle chassis independently on all sides then the chassis can be rotated relative to the wheel position to achieve fine pointing of <1 mil. This is illustrated by the change in wheel arm position between FIG. 4 and FIG. 5, the change in wheel arm position between FIG. 7 and FIG. 8, and/or between the change in wheel arm position between FIG. 9 and FIGS. 10 and/or 11.

In some examples rotation about the y-axis (e.g. pitch axis 212) may achieve the majority of the angling of the barrel 300, and the gun barrel actuator may be configured to pivot up to 10 degrees for "fine tuning" of the gun barrel position.

In some examples, when the barrel 300 is at a "low angle" (for example between 0 degrees and about 30 degrees to the x-axis, all the wheel arms may be pivoted to lower the chassis 200 close to the ground, minimising the overturning moment and increasing stability, thereby reducing the risk of tipping.

Hence there is provided a gun targeting system which enables a relatively lightweight vehicular solution for delivering a weapon system to a firing position and then targeting the gun of the weapon system, compared to examples of the related art. This is achieved by using the chassis suspension system 400 to position the gun barrel towards a targeting position so that further adjustment, if needed, is only for elevation of the gun barrel, which may be done by a separate actuator or manually. Hence, compared to a gun targeting system of the related art, the traverse system of related art solutions has been dispensed with. This has the advantage that by reducing the number of different systems on the platform, the total platform can be made lighter, hence more agile, faster, fuel efficient and overall more reliable than examples of the related art.

A further advantage of the system of the present disclosure is that because the system is configured so that the gun barrel cannot be swung about the z-axis, the system is less likely to tip over during firing of the gun. This is because while the width of the chassis 200 may have to be limited in order to allow for the gun targeting system to be transported and/or suitably narrow to fit through obstacles, the length of the chassis 200 may be greater than the width of the chassis 200 without jeopardising the transportability of the gun targeting system as a whole. Hence fixing the gun barrel relative to the longitudinal axis of the chassis (i.e. the longest axis of the chassis) provides maximum stability. Also since the wheel arms and wheels may be extended forward and aft of the chassis 200 this provides extra stability during the firing cycle.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gun targeting system comprising:
a chassis extending along an x-axis, a first end of the chassis and a second end of the chassis spaced apart from one another along the x-axis, the chassis extending along a y-axis, a first side of the chassis and a second side of the chassis spaced apart from one another along the y-axis, the x-axis defining a chassis roll axis, the y-axis defining a chassis pitch axis, and a z-axis defining a chassis yaw axis;
a gun barrel having a barrel axis, the barrel being mounted to the chassis by a pivot mount, the barrel being pivotable relative to the x-axis about a pivot axis aligned with the y-axis and mounted such that the barrel is constrained to move in a plane defined by the x-axis and the z-axis; and
a chassis suspension system comprising a plurality of wheel arms, each wheel arm extending away from a different chassis mount on the chassis to a respective wheel, each wheel being rotatably mounted on the respective wheel arm, each wheel configured for engagement with a support surface, each wheel arm and wheel configured to support the chassis apart from the support surface, each wheel arm being pivotable relative to the chassis such that the roll of the chassis about the x-axis, the pitch of the chassis about the y-axis, and the yaw of the chassis about the z-axis is controllable by pivoting at least one of the wheel arms relative to the chassis, and each wheel being pivotable relative to the respective wheel arm;
wherein the gun targeting system is configured to position the barrel towards an orientation to target an object by pivoting one or more wheel arms relative to the chassis and/or by pivoting one or more wheels relative to the respective wheel arm and/or by pivoting one or more wheel arms relative to the respective wheel.

2. The gun targeting system of claim 1, wherein:
each wheel arm has a chassis mount end and a wheel mount end;
the chassis mount end of each wheel arm being provided with a chassis mounting member, the chassis mount end of each wheel arm and chassis mounting member being pivotable relative to one another around a chassis mount pivoting axis; and
the chassis mounting member is configured to support the chassis mount end of the wheel arm so that the wheel arm and chassis mounting member are operable to pivot at least 180 degrees relative to one another about the chassis mount pivoting axis.

3. The gun targeting system claim 1, wherein:
each wheel arm has a chassis mount end and a wheel mount end;
the wheel mount end of each wheel arm is provided with a wheel mounting member, the wheel mount end of each wheel arm and wheel mounting member being pivotable relative to one another around a wheel mount pivoting axis; and
each wheel mounting member is configured to couple with the wheel mount end of the wheel arm so that each wheel arm and wheel mounting member are operable to pivot at least 180 degrees relative to one another about the wheel mount pivoting axis.

4. The gun targeting system of claim 3, wherein each wheel mounting member is provided with a wheel mounting member actuator to control the orientation of each wheel relative to the respective wheel arm.

5. The gun targeting system claim 4, comprising a control system configured to control the wheel mounting member actuators to pivot each wheel about the wheel mount pivoting axis, and each wheel mounting member actuator is operable independently of the other wheel mounting member actuators.

6. The gun targeting system of claim 5, wherein the gun barrel is coupled to a gun barrel actuator operable to pivot the gun barrel about the pivot axis, the control system being operable to control the gun barrel actuator to pivot the gun barrel about the pivot axis.

7. The gun targeting system of claim 6, wherein the control system is configured to control the wheel mounting member actuators and the gun barrel actuator to position the barrel to target the object.

8. The gun targeting system of claim 3, wherein each wheel arm is provided with a wheel arm actuator to control the orientation of each wheel arm relative to the chassis, and wherein each wheel mounting member is provided with a wheel mounting member actuator to control the orientation of each wheel relative to the respective wheel arm, the gun targeting system comprising a control system configured to control the wheel arm actuators and the wheel mounting member actuators to position the gun barrel to target the object.

9. The gun targeting system of claim 1, wherein each wheel arm is provided with a wheel arm actuator to control the orientation of each wheel arm relative to the chassis.

10. The gun targeting system of claim 9, comprising a control system configured to control the wheel arm actuators to: roll the chassis about the x-axis, pitch the chassis about the y-axis, and/or yaw the chassis about the z-axis, to orientate the chassis, and each wheel arm actuator is operable independently of the other wheel arm actuators.

11. The gun targeting system of claim 8, wherein the gun barrel is coupled to a gun barrel actuator operable to pivot the gun barrel about the pivot axis, the control system being operable to control the gun barrel actuator to pivot the gun barrel about the pivot axis.

12. The gun targeting system of claim 11, wherein each of the wheel arm actuators, wheel mounting member actuators, and the gun barrel actuator are operable independently of each other actuator.

13. The gun targeting system of claim 12, wherein the control system is configured to control the wheel arm actuators, wheel mounting member actuators, and the gun barrel actuator to position the barrel to target the object.

14. The gun targeting system of claim 10, wherein the gun barrel is coupled to a gun barrel actuator operable to pivot the gun barrel about the pivot axis, the control system being operable to control the gun barrel actuator to pivot the gun barrel about the pivot axis.

15. The gun targeting system of claim 1, wherein at least one of the wheels is coupled to a drive system to rotate the at least one of the wheels relative to the respective wheel arm to thereby move the gun targeting system from one location to another.

16. The gun targeting system of claim 15, wherein each wheel arm is provided with a wheel arm actuator to control the orientation of each wheel arm relative to the chassis, the gun targeting system comprising a control system configured to control the wheel arm actuators to roll the chassis about the x-axis, pitch the chassis about the y-axis, and/or yaw the chassis about the z-axis, to orientate the chassis so as to fine tune position of the gun barrel with respect targeting the object, and each wheel arm actuator is operable independently of the other wheel arm actuators, and wherein the control system is further configured to control the drive system to thereby drive the at least one of the wheels to move the gun targeting system from one location to another so as to coarse tune the position of the gun barrel with respect targeting the object.

17. The gun targeting system of claim 15, wherein the drive system comprises an actuator coupled to the or each wheel, wherein each wheel drive actuator is operable independently of each other wheel drive actuator.

18. The gun targeting system of claim 1, wherein the x-axis is at a right angle to the y-axis, and the z-axis is perpendicular to the x-axis and the y-axis, the gun targeting system including a control system configured to tune positioning of the gun barrel with respect to targeting the object, by controlling pivoting of the one or more wheel arms relative to the chassis and/or by controlling pivoting of the one or more wheels relative to the respective wheel arm and/or by controlling pivoting of the one or more wheel arms relative to the respective wheel.

19. A method of control of a gun targeting system, the gun targeting system including a gun barrel, a chassis, wheel arm actuators, wheel mounting member actuators, a wheel drive system, and a gun barrel actuator, the gun barrel mounted to the chassis; wherein the chassis extends along an x-axis, a first end of the chassis and a second end of the chassis are spaced apart from one another along the x-axis; wherein the chassis extends along a y-axis, a first side of the chassis and a second side of the chassis spaced apart from one another along the y-axis; the x-axis defining a chassis roll axis, the y-axis defining a chassis pitch axis, and a z-axis defining a chassis yaw axis; the gun barrel having a barrel axis and being pivotable relative to the x-axis about a pivot axis parallel with the y-axis and mounted such that the gun barrel is constrained to move in a plane defined by the x-axis and z-axis; the wheel arm actuators, the wheel mounting member actuators, and the wheel drive system forming part of a chassis suspension system coupled to the chassis, and the gun barrel actuator coupled to the gun barrel; wherein the method comprises:

controlling the wheel drive system to transport the gun targeting system to a gun firing location; and controlling at least one of the wheel mounting member actuators and/or at least one of the wheel arm actuators, to position the barrel towards an orientation to target the an object.

20. The method of claim 19, wherein the x-axis is at a right angle to the y-axis, and the z-axis is perpendicular to the x-axis and the y-axis, the method further comprising controlling the gun barrel actuator to position the barrel towards the orientation to target the object.

\* \* \* \* \*